(No Model.)

E. A. JEANES.
CRATE.

No. 485,466. Patented Nov. 1, 1892.

Witnesses:
Wm. C. Dashiell
A. G. Bishop

Inventor:
Elisha A. Jeanes
By R. H. Bishop,
Atty.

UNITED STATES PATENT OFFICE.

ELISHA A. JEANES, OF LAMPASAS, TEXAS.

CRATE.

SPECIFICATION forming part of Letters Patent No. 485,466, dated November 1, 1892.

Application filed April 13, 1892. Serial No. 429,023. (No model.)

*To all whom it may concern:*

Be it known that I, ELISHA A. JEANES, a citizen of the United States, residing at Lampasas, in the county of Lampasas and State of Texas, have invented certain new and useful Improvements in Crates; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to produce a crate especially adapted for shipping bananas, which will be of light weight and which can be manufactured at a slight cost. This object I accomplish by the use of the device illustrated in the accompanying drawings; and the invention consists in certain novel features of the same, as will be hereinafter described and claimed.

Figure 1:
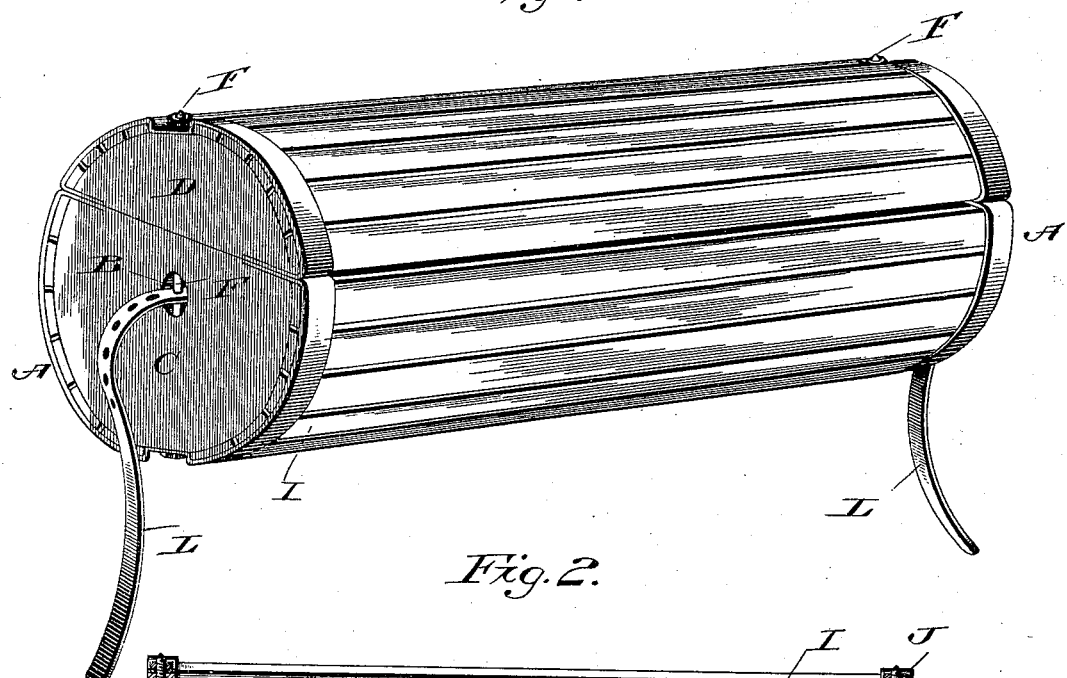
Figure 2:
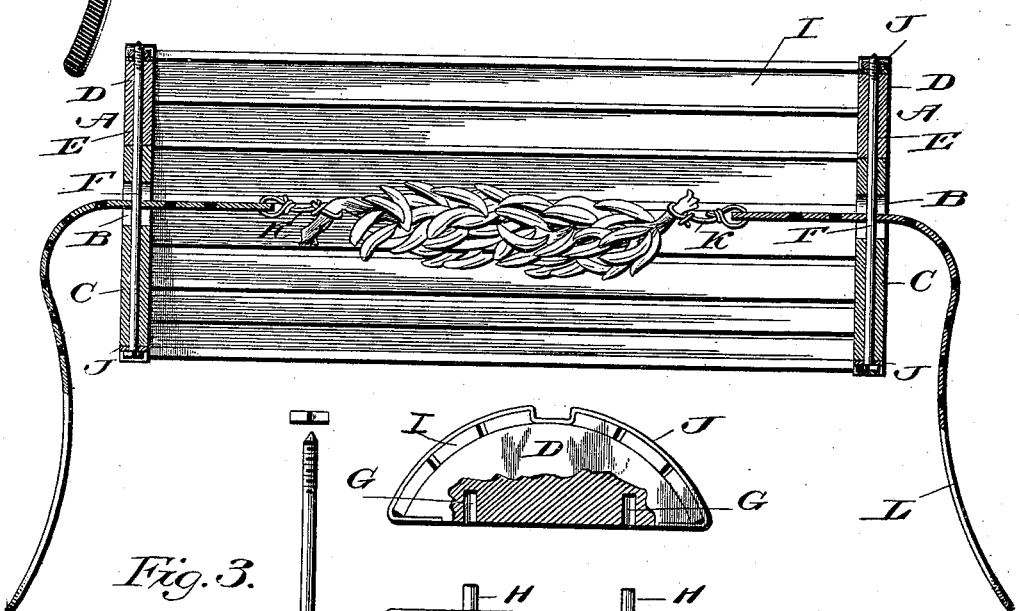
Figure 3:
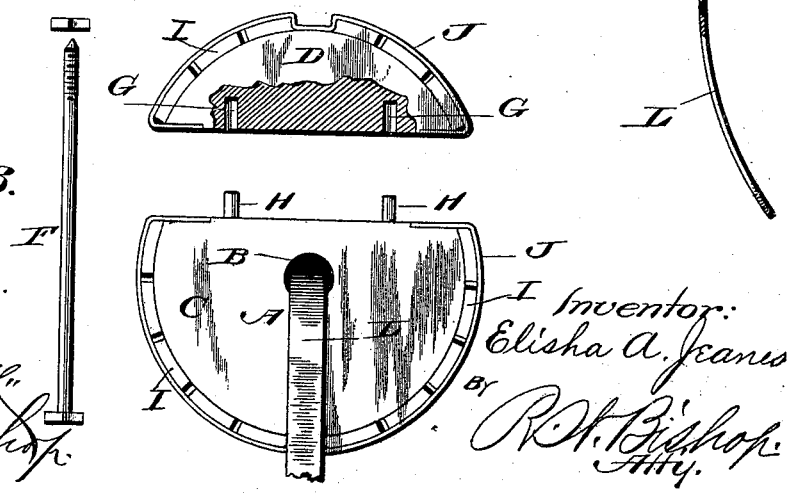

In the drawings, Figure 1 is a perspective view of my improved crate arranged for shipping. Fig. 2 is a longitudinal sectional view of the same; and Fig. 3 is a detail view of one end, showing the manner of separating the crate to permit the removal of the fruit.

In carrying out my invention I employ two heads or ends A A, which are light wooden plates of equal size and may be circular or of any desired polygonal form. These plates are provided with the central apertures B and are divided, so as to present the unequal segmental portions C D, the larger one C forming the foundation for the body of the crate and the smaller one D forming part of the lid. These segmental portions C D are provided with the diametrical registering openings E, through which the fastenings-bolts F are passed. They are further provided on their meeting edges with the registering recesses G and pins or studs H, which serve to prevent the two parts of the crate from slipping on each other. The strain on the fastening-bolts is thus relieved and bending of the same is prevented. The ends or heads are connected by the slats I, which have their ends secured to the edges of the said heads or ends. Binding-strips J, of sheet metal, are then secured over the ends of the slats, as clearly shown.

The bunch of bananas is suspended within the crate by means of the cords K, which have their ends secured to the ends of the stalk and the ends of the straps L, which pass out through the apertures B in the ends of the crate and are secured by the fastening-screws, as shown most clearly in Fig. 2.

At the present time bananas are handled in transportation without any inclosing case and are suspended by their stalks. It is obvious that this method of transporting the fruit necessitates the utilization of considerable room and calls for great care in handling, in order to prevent the loss of a large quantity of the fruit. By the use of my crate these objections are entirely overcome. The crate is made of a proper size to fit neatly around the bunch of fruit and can be handled rapidly and without the exercise of any great caution without in any wise injuring the fruit. Furthermore, the crates may be stored one above another, thus effecting an economy of space.

It will be noticed that the crate is easily fastened and unfastened and that the bolt which fastens the crate serves, also, to secure the strap that holds the bunch. This strap, furthermore, can be readily adjusted to the length of the bunch, and as the bunch is suspended at both ends there is no liability of the fruit being injured or any of it being detached in transit by rolling around or swinging against the sides of the crate.

While my crate is intended more especially for use in shipping bananas, it can be used, of course, for shipping other commodities.

Having thus described my invention, what I claim, and desire to secure by Letters Patent, is—

1. A crate consisting of slats forming its sides, ends or heads divided into two parts, and fastening-bolts passed diametrically through the said heads or ends.

2. The combination, with the crate, of the suspending-straps passed centrally through the ends of the same and means for securing said straps at any desired point of their length in the said ends of the crate.

3. The combination of the crate having its ends in two separable portions, the suspending-straps passed centrally through the ends of the crate, and the fastening-bolts passed diametrically through the said ends and through the suspending-straps.

4. A crate provided with separable ends, having engaging studs and recesses and fastening-bolts passed diametrically through said ends.

In testimony whereof I affix my signature in presence of two witnesses.

ELISHA A. JEANES.

Witnesses:
ED. BAILEY,
I. W. HEWETT.